United States Patent
Sprokel

[11] 3,912,366
[45] Oct. 14, 1975

[54] LIQUID CRYSTAL DISPLAY ASSEMBLY HAVING POLYIMIDE LAYERS

[75] Inventor: Gerard J. Sprokel, San Jose, Calif.

[73] Assignee: International Business Machines Corporation, Armonk, N.Y.

[22] Filed: Dec. 6, 1973

[21] Appl. No.: 422,236

[52] U.S. Cl. .......................................... 350/160 LC
[51] Int. Cl.² .............................................. G02F 3/00
[58] Field of Search ............................. 350/160 LC

[56] References Cited
UNITED STATES PATENTS

| | | | |
|---|---|---|---|
| 3,600,060 | 8/1971 | Churchill et al. | 350/160 |
| 3,694,053 | 9/1972 | Kahn | 350/160 X |
| 3,700,306 | 10/1972 | Cartmell et al. | 350/160 X |
| 3,836,231 | 9/1974 | Cole, Jr. | 350/160 LC |

OTHER PUBLICATIONS

Greubel and Wolff, "Electrically Controllable Domains in Nematic Liquid Crystals," Applied Physics Letters, Vol. 19, No. 7, Oct. 1971, pp. 213–215.

*Primary Examiner*—Alfred E. Smith
*Assistant Examiner*—Rolf Hille
*Attorney, Agent, or Firm*—David M. Bunnell

[57] ABSTRACT

Liquid crystal display cells having a nematic liquid crystal material sandwiched between two electrode carrying supporting substrates, incorporate polyimide layers for dielectric and optical purposes.

5 Claims, 4 Drawing Figures

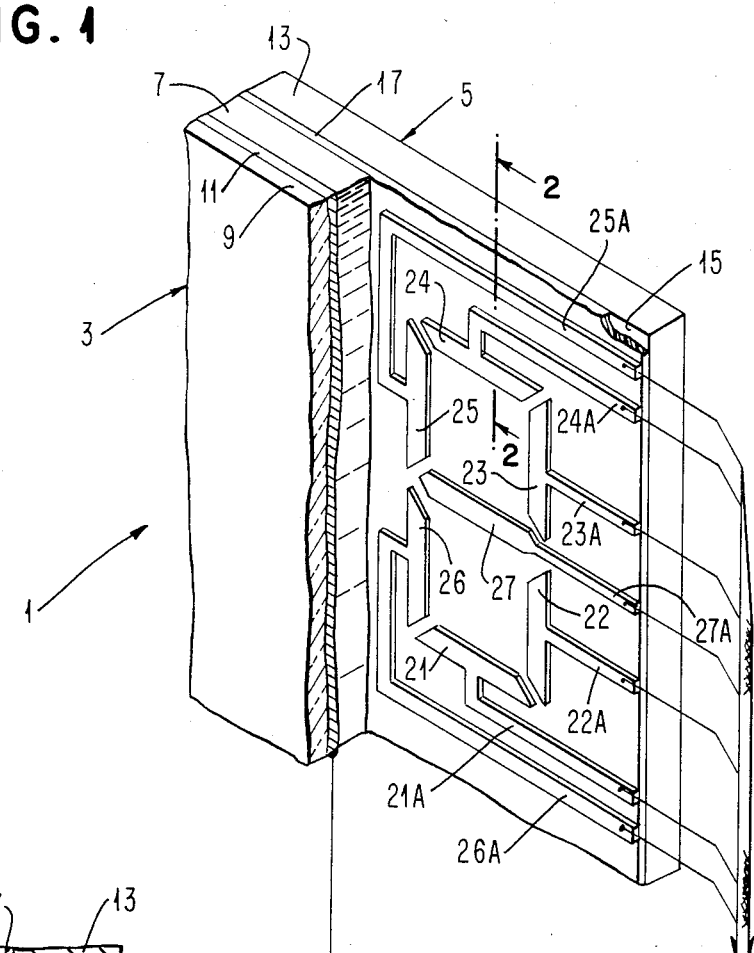
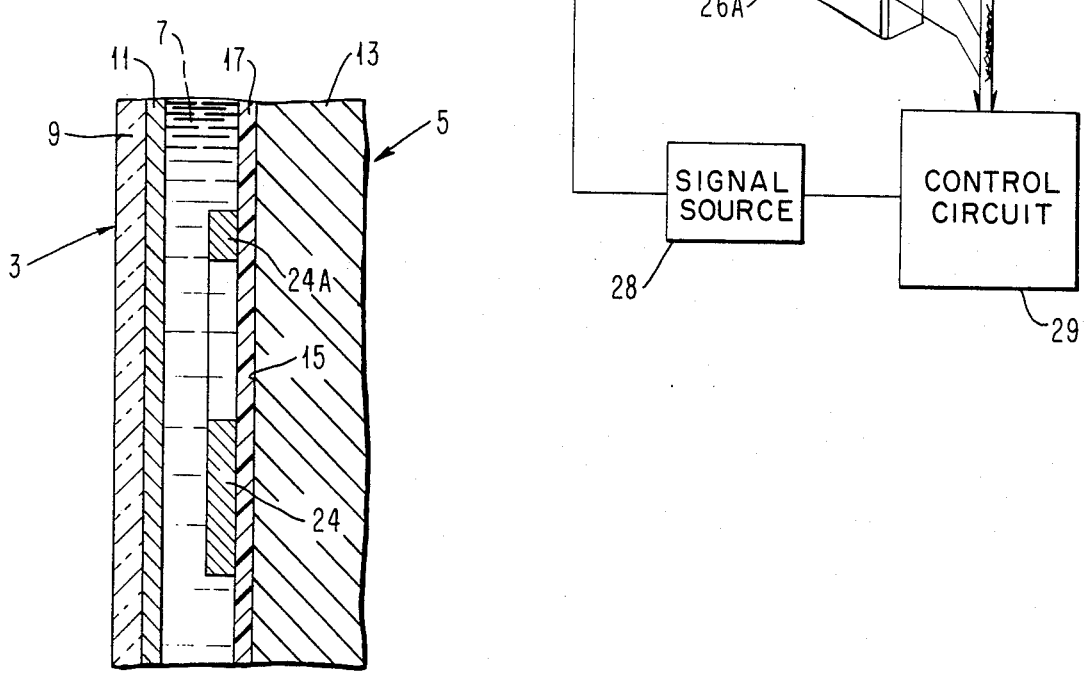

LIQUID CRYSTAL DISPLAY ASSEMBLY HAVING POLYIMIDE LAYERS

BACKGROUND OF THE INVENTION

This invention relates generally to liquid crystal devices, and more particularly to nematic liquid crystal display assemblies.

Nematic liquid crystals are subject to electro-optical effects which have given rise to their well known use in display devices. Such materials and devices are described, for example, in U.S. Pat. Nos. 3,625,691 and 3,656,834.

The display devices typically have a liquid crystal material sandwiched between two electrode carrying supporting substrates with the substrates being sealed together at the edges. When an electrical potential is applied across the liquid crystal film, either a turbulent flow of the liquid crystal material molecules occurs (light scattering type) or the molecules are oriented in a new direction (field effect type) such that the areas of the liquid crystal film which are subjected to the electrical field are observed to be lighter or darker than the background areas, when viewed in polarized light. The display devices are either reflective, in which case the back substrate is reflective and the front substrate is transparent, or transmissive in which case both substrates are transparent and the device is back lighted.

The nature and history of the substrate and/or electrode surfaces which are in contact with the liquid crystal material can effect the orientation directions of the crystal in those areas, which effects are usually unpredictable. This is especially true with glass surfaces. Also, in the reflective mode a nonconducting surface is needed upon which to form the electrode pattern which limits the choice of suitable substrates. Usually glass substrates having backsided mirror coatings are employed. The quality of the display is a function of the contrast between the activated and background areas. The contrast and consequently the quality of the display is effected by the above considerations.

SUMMARY OF THE INVENTION

A liquid crystal display structure has now been devised which increases the choice of substrates which can be employed. In addition, the structure provides for a display having striking contrast between activated and background areas.

In accordance with this invention, there is provided a liquid crystal display cell having a nematic liquid crystal material sandwiched between two electrode carrying substrates. The inner surface of at least one substrate is coated with a transparent layer of an imide polymer. In another aspect of the invention at least one electrode is overcoated with a dielectric coating of an imide polymer. Such protected electrode structures are generally described in my co-pending application Ser. No. 303,555, filed Nov. 3, 1972.

The polyimide coatings are applied by coating the substrate with the polyamic acid intermediate using solvent coating techniques. When cured, the polyimide coatings are able to withstand conventional electrode forming processes, have excellent electrical insulating properties, and provide surprising enhancement of the optical properties of the liquid crystal cell.

The foregoing and other objects, features, and advantages of the invention will be apparent from the following more particular description of preferred embodiments of the invention as illustrated in the accompanying drawings.

DESCRIPTION OF THE DRAWINGS

FIG. 1 is a perspective view, partly in section, illustrating an embodiment of the invention using a polyimide coated reflective substrate in a nematic liquid crystal cell.

FIG. 2 is a cross sectional view taken along line 2—2 of FIG. 1.

DETAILED DESCRIPTION

Figure 3:
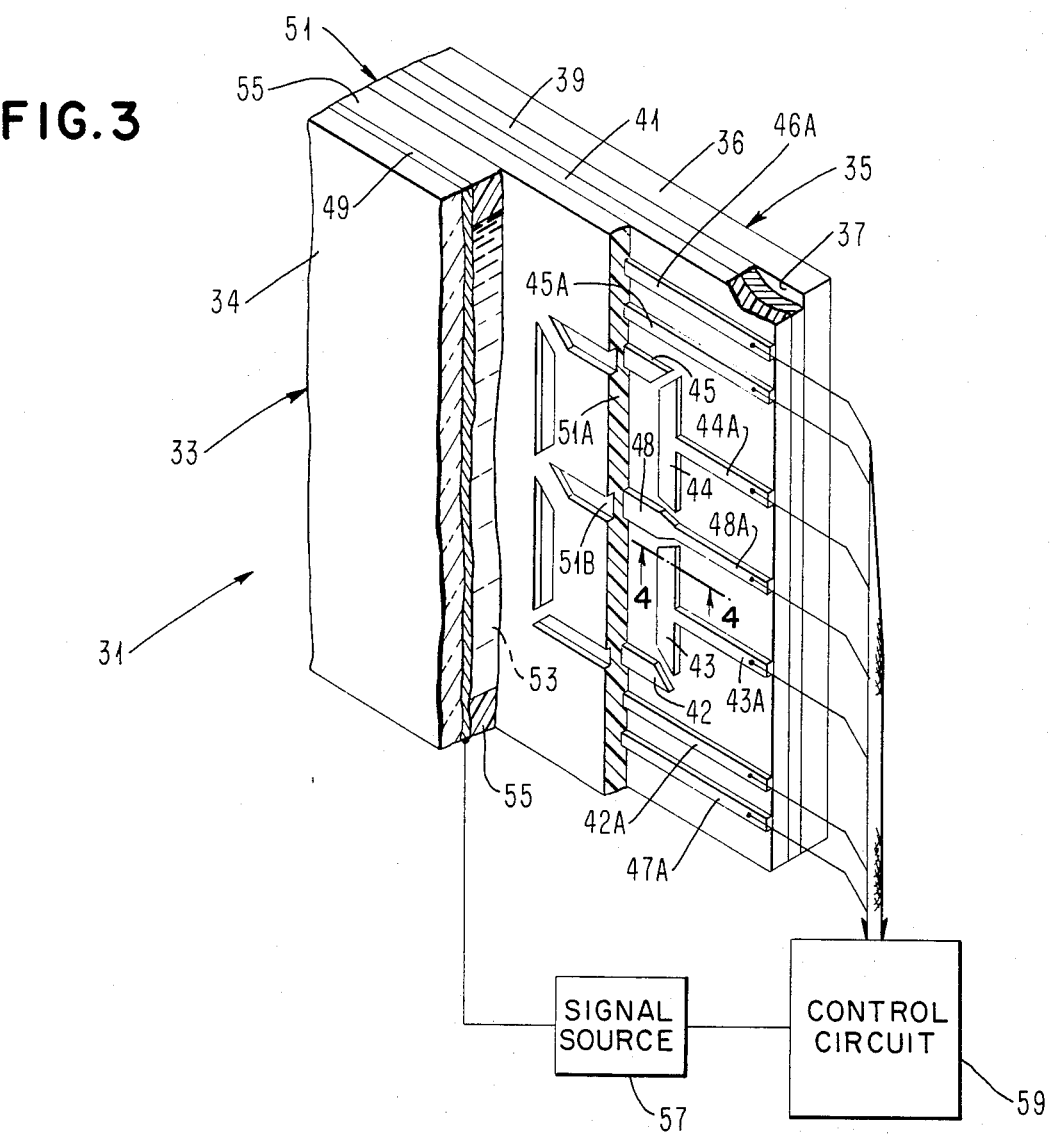
FIG. 3 is a perspective view, partly in section, illustrating an embodiment of the invention utilizing polyimide layers as a substrate coating, a dielectric or insulating coating over an electrode, and as a etch seal of a nematic liquid crystal cell.

In FIGS. 1 and 2, a liquid crystal cell is shown adapted as a display assembly for optical representation of desired configurations, here specifically illustrated as a numerical display.

Liquid crystal cell 1 is fabricated from two planar support units 3 and 5 which are disposed in parallel relationship to each other to define an enclosed area in which is contained a film or layer 7 of a nematic liquid crystal material, for example, p-methoxybenzylidene-p-n-butylaniline, commonly known as MBBA. In accordance with usual practice, only one of the planar supports need be transparent, while the other of the supports may be transparent, reflective or absorptive depending upon the desired mode of operation. In the embodiment shown, support unit 3 includes a transparent substrate 9 having deposited on it a conductive film 11. Support unit 5 is formed of an aluminum substrate 13 having a mirror finish on its front surface 15. Coated on surface 15 is a layer 17 of a polyimide having deposited on it a conductive film pattern which illustratively is for numerical representation, with it being understood that patterns for other representations can be employed. Because the polyimide coating is an excellent electrically insulating coating, metal substrates having reflective surfaces other than aluminum can be employed, as well as conventionally used glass substrates coated with a reflective film such as, for example, chromium. The aluminum substrate provides a lightweight support unit which is an important advantage where large displays are involved. The metal support unit can be easily drilled to provide filling holes for the insertion of the liquid crystal material. Polyimide layer 17 thicknesses up to about 0.5 mil (about 13 microns) are usually employed, thicker layers can be used but are unnecessary. The layer should be thick enough to provide the desired optical and electrical insulating properties with layer thicknesses of about 5 to about 10 microns being preferred. The layers are applied by conventional dip coating or spin coating techniques from a solvent solution of a polyamic polymer intermediate followed by removal of the solvent and curing of the layer at the temperature usually employed to form the cured polyimide i.e., 350° to 400°C.

Polyimide sheet film of nominally 1 mil thickness is commercially available. However, drawn films are not suitable for display cells operating in the field effect mode. The film forming process leads to considerable molecular alignment of the polymer and the film itself becomes birefringent. The combination of film and liquid crystal leads to color effects which are considered undesirable. Cast or spun coated polyimide layers on the other hand, do not show molecular alignment and are optically isotropic.

The polyimide layers useful in the process of the invention are described for example, in U.S. Pat. Nos. 3,179,634 and 3,179,614. The coating solutions are polyamic acid intermediates formed by the reaction of diamines with dianhydrides. Preferred for the layers of the invention are polyamic acids formed by the reaction of aromatic diamines with aromatic dianhydrides such as pyromelitic dianhydride as shown by the formula below

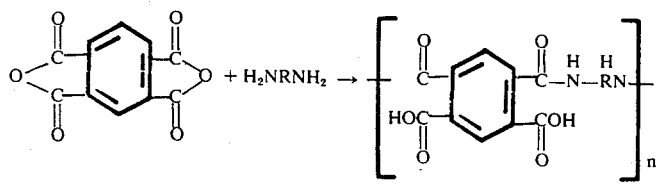

where R is a divalient benzenoid radical such as napthyl, dibenzyl and diphenylether. When the polyimide intermediate layer is heat cured, a polyimide polymer is formed having the repeating unit of:

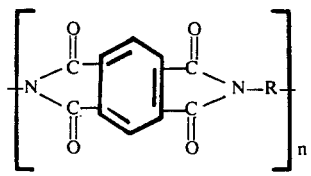

Such compositions are marketed, for example, by E. I. Du Pont de Nemours and Company under the trade name PYRE-M.L. wire enamel. Du Pont type RC 5057 was used for the cells which is a pyromellitic dianhydride based polymer with the following properties: polymer solids 16.5%, converted polymer solids 15.2%, pounds/gallon 8.80, solution density 1.059, viscosity in poises at 25°C 50–70, flash point 75, aromatic hydrocarbon solvent with a few parts per million of N-methyl-2-pyrrolidone added as a flow agent.

The particular electrode pattern shown on the surface of layer 17 can be deposited as a plurality of spaced film segments of a conductive material to define a like plurality of electrode image segments 21 to 27 each of which as a corresponding one of associated conductor or lead segments 21A to 27A which extend to an edge of the substrate where connection is made to a signal source 28 and addressing circuits generally indicated as control circuit 29 in the drawings. Typically the electrode films are deposited in a thickness of about 1000A. Because polyimide layer 17 has excellent thermal properties, in spite of its being an organic polymer, the electrode segments can be formed by the techniques employed for glass substrates. In the embodiment shown, an $In_2O_3/SnO_2$ layer was RF sputtered onto the surface of layer 17 and then etched to the desired electrode image pattern.

Support unit 3 also includes substrate 9 which in this case is glass having coated thereon a conductive coating 1 which is transparent as is conventional in the reflecting mode of operation. The electrode in the embodiment shown is formed of $In_2O_3/SnO_2$.

Upon assembly of the units of the cell, liquid crystal layer 7 is confined between support units 3 and 5 using a conventional seal around their peripheries as, for example, a gasket or epoxy resin. As shown in the further embodiment of the invention in FIG. 3, polyimide spacers of, for example, 15 to 25 microns in thickness are used to seal and determine the thickness of the cell.

The operation of the cell is conventional. It is noted that when operated in the dynamic scattering mode striking contrast is obtained between the scattering areas, where the image segments were activated, and the undisturbed background areas. The polyimide layer acted to remove the glare which is objectionable in prior reflective displays. Operation voltages for dynamic scattering is about 10 Vrms, sine wave. The frequency is determined by the doping level and the nature of the dopant as described in my copending patent application Ser. No. 372,120 filed June 6, 1972.

Figure 4:
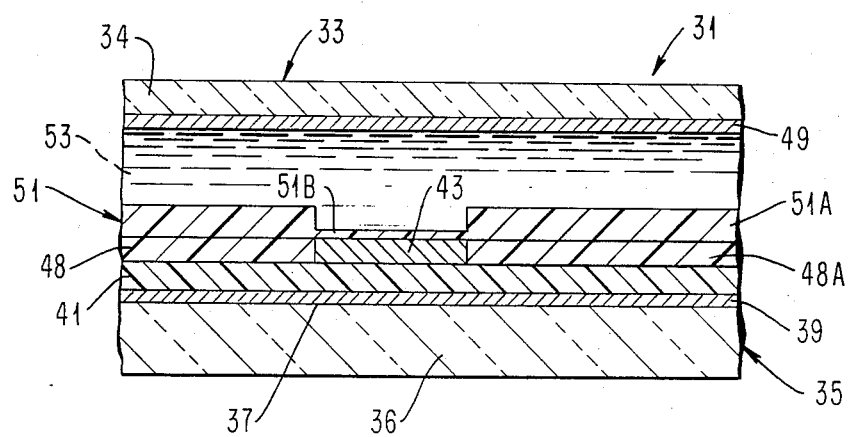
FIG. 4 is a cross sectional view taken along line 4—4 of FIG. 3.

FIGS. 3 and 4 illustrate an embodiment of the invention in which the polyimide layer is also used as a second layer for cells made with blocking electrodes as is described in my previously mentioned application Ser. No. 303,555, filed Nov. 3, 1972 whose teachings are hereby incorporated by reference.

As described in the above mentioned application, dielectric layers are employed to separate the liquid crystal material from the conductor layers. By varying the thickness of the dielectric layer the threshold frequencies at which the liquid crystal material will be activated are chosen to permit sequential operation of different portions of the liquid crystal cell. The suppression of activation in the lead line portions of the conductive coating pattern is accomplished by using thick layers. As described in the embodiment of FIGS. 3 and 4, it has been found that polyimide layers are suitable coatings for this purpose. Their electrical and physical and optical properties are excellent and the coatings have the advantage of easy application from solvent solutions by conventional coating techniques as opposed to other dielectric materials which require sputtering.

Display assembly 31 includes support units 33 and 35 of glass with surface 37 of glass substrate 36 being coated with a reflective layer 39 of aluminum. Layer 39 is in turn coated with a 5 to 10 micron thick layer 41 of polyimide. Formed on the surface of polyimide layer 41 is an electrode pattern comprised of image segments 42 to 48 and conductor segments 42A to 48A. (the left hand segments 46 and 47 are beneath layer 51)

It should be understood that although a seven segmented numeric display cell is illustrated, other display assemblies could also be employed such as those utilizing a cross grid electrode system. Typically, such systems employ an array of parallel spaced electrode strips on the inner face of the other substrate being coated with an array of parallel spaced electrodes aligned in a direction perpendicular to that of the first array. Under operating conditions, the liquid crystal is activated at desired cross sections of the spaced electrodes, whose selection is readily made by suitable addressing circuits which are well known in the art.

The conductive segments are formed of sputtered In$_2$O$_3$/SnO$_2$ having a thickness of about 1000A. Carried on glass substrate 34 of unit 33 is a 1000A thick transparent conductive coating 49 of tin oxide or In$_2$O$_3$. Coated on the conductive segments 42 to 48 and the lines 42A to 48A is a variable thickness layer 51 of polyimide. Layer thicknesses of about 5 microns are used to cover the conductor line portions 42A to 48A and function as a blocking layer 51A which prevent dynamic scattering at any frequency. Thinner layers 51B are employed over the image segments 42 to 48, for example, in the range of .1 to 2 microns. The layer thicknesses are chosen so that the cell will operate within a prescribed frequency range depending on the identity of the liquid crystal material, the dopant, and the dopant concentration.

For example, if one uses a polyimide layer thickness of up to 2 microns on the display elements and at least 5 microns on the connector lines and a liquid crystal material such as distilled MBBA doped with $5.7 \times 10^{-6}$ mol/ml of dibenzyl dimethyl ammonium chloride to obtain a resistivity of $0.5 \times 10^9$ ohm-cm the cell will operate up to 500Hz with only the display sections being activated but not the connector lines.

It should be understood that the liquid crystal composition named is for illustrative purposes only. Other quaternary ammonium salts can be used as is known to those skilled in the art. However, the solubility and the degree of ionization in MBBA solutions differs greatly among the members of this group. Thus, for example, dodecyl trimethyl ammonium chloride or hexadecyl trimethyl ammonium chloride are sufficiently soluble but hexadecyl trimethyl ammonium bromide is not. An example of a pyridinium compound is hexadecyl pyridium bromide.

Electrode segments 42 to 48 and their corresponding conductor or lead segments 42A to 48A along with conductive layer 49 are connected to signal source 57 under control of addressing circuitry generally represented as control circuit 59. The assembly 31 is then activated by the control circuitry to display a selected numeric character.

The variable thickness polyimide coating is conveniently prepared by selectively building up multiple layers of different thickness of polyimide using conventional photolithographic or screening techniques. By employing polyimide layer thicknesses of varying thickness in different portions of the image segments, different threshold frequencies below the cutoff frequency of the liquid crystal can be used to selectively turn on different portions of the liquid crystal layer. Polyimide spacer 55 having a thickness of 15-25 microns is used to seal and determine the thickness of the liquid crystal cell.

Besides the improvement in contrast, it was also noted that the polyimide layers aided in inducing parallel alignment of undoped liquid crystal materials which was more uniform than obtained with a glass surface. This was evidenced by the removal of the slight turbidity observed with glass surfaces caused by misaligned regions.

While the invention has been particularly shown and described with reference to particular embodiments thereof, it will be understood by those skilled in the art that the above and other various changes in form and details may be made therein without departing from the spirit and scope of the invention.

What is claimed is:

1. A liquid crystal display cell comprising:

first and second spaced apart support members, said first member being transparent and said second member being reflective;

a transparent layer of imide polymer having a thickness of between about 5 and 10 microns coated on the facing surface of said second member;

a first electrode formed on the surface of said imide polymer layer;

a dielectric coating formed on the surface of said first electrode;

a second transparent electrode formed on the facing surface of said first support member;

a nematic liquid crystal material located between said electrodes;

and means to apply a voltage of predetermined magnitude and frequency across said electrodes to cause dynamic scattering in said liquid crystal material.

2. The cell of claim 1 wherein said dielectric coating is an imide polymer.

3. The cell of claim 1 wherein said second member is metal with a polished reflective surface.

4. The cell of claim 1 wherein said second member is glass having a layer of reflecting material coated thereon.

5. The cell of claim 1 wherein said imide polymer layer is formed of a heat cured polyamic acid intermediate of an aromatic diamine and an aromatic dianhydride.

* * * * *